(12) United States Patent
Liu et al.

(10) Patent No.: US 11,356,895 B2
(45) Date of Patent: Jun. 7, 2022

(54) METHOD AND APPARATUS FOR LOAD BALANCING

(71) Applicant: NOKIA SOLUTIONS AND NETWORKS SYSTEM TECHNOLOGY (BEIJING) CO., LTD., Beijing (CN)

(72) Inventors: Yang Liu, Beijing (CN); Lei Du, Beijing (CN)

(73) Assignee: NOKIA SOLUTIONS AND NETWORKS SYSTEM TECHNOLOGY (BEIJING) CO., LTD., Beijing (CN)

(*) Notice: Subject to any disclaimer, the term of this patent is extended or adjusted under 35 U.S.C. 154(b) by 0 days.

(21) Appl. No.: 16/651,146

(22) PCT Filed: Sep. 29, 2017

(86) PCT No.: PCT/CN2017/104243
§ 371 (c)(1),
(2) Date: Mar. 26, 2020

(87) PCT Pub. No.: WO2019/061246
PCT Pub. Date: Apr. 4, 2019

(65) Prior Publication Data
US 2020/0275316 A1   Aug. 27, 2020

(51) Int. Cl.
*H04W 28/08* (2009.01)
*H04W 84/04* (2009.01)

(52) U.S. Cl.
CPC ...... *H04W 28/0815* (2020.05); *H04W 84/045* (2013.01)

(58) Field of Classification Search
CPC ............... H04L 47/125; H04L 67/1031; H04L 67/1017; H04L 67/12; H04L 67/1004;
(Continued)

(56) References Cited

U.S. PATENT DOCUMENTS 10,432,551 B1 * 10/2019 Vosshall ............... G06F 9/5083
10,560,372 B1 * 2/2020 Lucas .................. H04L 47/125
(Continued)

FOREIGN PATENT DOCUMENTS

CN    102577467 A    7/2012
CN    102905229 A    1/2013
(Continued)

OTHER PUBLICATIONS

"3rd Generation Partnership Project; Technical Specification Group Radio Access Network; Study on New Radio Access Technology; Radio Access Architecture and Interfaces (Release 14)", 3GPP TR 38.801, V0.4.0, Aug. 2016, pp. 1-36.
(Continued)

*Primary Examiner* — Jung Liu
(74) *Attorney, Agent, or Firm* — Squire Patton Boggs (US) LLP (57) ABSTRACT

A method and apparatus for load balancing. The method executed by a master base station for load balancing comprising: determining a load balancing group, wherein the load balancing group includes a plurality of secondary base stations; and sending a grouping information about the load balancing group to each secondary base station of the load balancing group. The method executed by a secondary base station of a load balancing group for load balancing comprising: receiving a grouping information about the load balancing group from a master base station; exchanging the load information with other secondary base stations of the load balancing group; selecting a target secondary base station from the other secondary base stations according to the load information of other secondary base stations; and forwarding at least a portion of load of the secondary base station to the target secondary base station.

9 Claims, 4 Drawing Sheets

(58) Field of Classification Search
CPC ........ H04L 67/125; H04W 4/08; H04W 4/70; H04W 4/38; H04W 48/06; H04W 48/20; H04W 28/06; H04W 28/08; H04W 84/12; H04W 28/0815; H04W 84/045; H04W 28/0808; G06F 30/33; H04Q 7/24; H04Q 7/20

See application file for complete search history.

(56) References Cited

U.S. PATENT DOCUMENTS

| | | | | |
|---|---|---|---|---|
| 2007/0115906 A1* | 5/2007 | Gao | ........................ | G06F 30/33 370/338 |
| 2007/0243910 A1* | 10/2007 | Ryu | .................. | H04W 52/0219 455/574 |
| 2007/0258465 A1* | 11/2007 | Ma | ........................ | H04W 28/08 370/395.53 |
| 2010/0157901 A1 | 6/2010 | Sanderovitz et al. | | |
| 2012/0028648 A1 | 2/2012 | Chayat et al. | | |
| 2012/0210416 A1* | 8/2012 | Mihelich | ............. | H04L 67/1004 726/11 |
| 2014/0098670 A1 | 4/2014 | Choi et al. | | |
| 2014/0304414 A1* | 10/2014 | Yengalasetti | ........ | H04L 67/1036 709/226 |
| 2014/0321278 A1* | 10/2014 | Cafarelli | ................. | H04L 43/12 370/235 |
| 2014/0359131 A1* | 12/2014 | Seed | ................... | H04L 67/1031 709/226 |

FOREIGN PATENT DOCUMENTS

| | | |
|---|---|---|
| CN | 103781120 A | 5/2014 |
| WO | 2016/087588 A1 | 6/2016 |

OTHER PUBLICATIONS

"CP/UP separation for NR", 3GPP TSG-RAN WG3#93, R3-161805, Agenda : 10.5.1, Deutsche Telekom, Aug. 22-26, 2016, pp. 1-4.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)", 3GPP TS 36.300, V13.2.0, Dec. 2015, pp. 1-290.
"Further Thoughts on CP and UP Separation Architecture", 3GPP TSG RAN WG3 Meeting#93, R3-161594, Agenda : 10.1.2, ZTE, Aug. 22-26, 2016, pp. 1-8.
"C-plane and U-plane separation of NR RAN", 3GPP TSG RAN WG3 Meeting #93, R3-161574, Agenda : 10.3.1, Intel Corporation, Aug. 22-26, 2016, pp. 1-4.
"3rd Generation Partnership Project; Technical Specification Group Radio Access Network; Evolved Universal Terrestrial Radio Access (E-UTRA); Radio Resource Control (RRC); Protocol specification(Release 13)", 3GPP TS 36.331, V13.2.0, Jun. 2016, pp. 1-623.
"3rd Generation Partnership Project;Technical Specification Group Radio Access Network; Evolved Universal Terrestrial Radio Access Network(E-UTRAN); X2 application protocol (X2AP) (Release 13)", 3GPP TS 36.423, V13.4.0, Jun. 2016, pp. 1-238.
International Search Report and Written Opinion received for corresponding Patent Cooperation Treaty Application No. PCT/CN2017/104243, dated Jun. 26, 2018, 9 pages.
"Text Proposal for SCG Change Indication", 3GPP TSG-RAN WG3 Meeting #86, R3-143012, Agenda : 20.1.2, Huawei, Nov. 17-21, 2014, pp. 1-8.
Extended European Search Report received for corresponding European Patent Application No. 17927279.4, dated Mar. 2, 2021, 10 pages.
"3rd Generation Partnership Project;Technical Specification Group Radio Access Network;RAN enhancements for UMTS/HSPA and LTE interworking(Release 12)", 3GPP TR 37.852 V12.0.0, Dec. 2013, pp. 1-34.

\* cited by examiner

METHOD AND APPARATUS FOR LOAD BALANCING

RELATED APPLICATION

This application claims priority to PCT Application No. PCT/CN2017/104243, filed on Sep. 29, 2017, which is incorporated herein by reference in its entirety.

TECHNICAL FIELD

The present disclosure relates to a field of wireless communication, and more specifically, to a method and apparatus for load balancing.

BACKGROUND

In order to meet the increasing business requirements of operators, it has been proposed to deploy secondary base stations intensively in the coverage area of a master base station. Accordingly, with a user equipment (UE)'s location changing, frequent cell handover leads to a large amount of signaling overhead. Therefore, it has been proposed that the UE receives the control signaling from the master base station and the user data from multiple secondary base stations so as to minimize the signaling overhead and to boost capacity.

In order to balance the load of multiple secondary base stations, load balancing may be performed among multiple secondary base stations. In the prior art, the load balancing in multi-connectivity operation is dominated by the master base station. For example, when a secondary base station in the coverage area of the master base station decides to release a portion of its load, it sends a release request to the master base station. After receiving a release ACK from the master base station, it forwards the portion of its load to the master base station. The master base station then selects and sends a load balancing request to another secondary base station which is also in the coverage area of the master base station. After receiving a load balancing ACK from another secondary base station, the master base station forwards the portion of the secondary base station's load to another secondary base station. It is obvious that the load balancing in the prior art introduces too much delay as well as signaling overhead from UE or network perspective, especially for some of the 5G services which require less delay than the services in LTE. Moreover, the interaction of signaling between the master base station and the secondary base stations during the load balancing is complicated.

SUMMARY OF THE INVENTION

According to one aspect of the present disclosure, a method executed by a master base station for load balancing is provided. The method comprises: determining a load balancing group, wherein the load balancing group includes a plurality of secondary base stations; and sending a grouping information about the load balancing group to each secondary base station of the load balancing group.

According to another aspect of the present disclosure, a master base station for load balancing is provided. The master base station comprises: a determining unit configured to determine a load balancing group, wherein the load balancing group includes a plurality of secondary base stations; and a sending unit configured to send a grouping information about the load balancing group to each secondary base station of the load balancing group.

According to another aspect of the present disclosure, a method executed by a secondary base station of a load balancing group for load balancing is provided. The method comprises: receiving a grouping information about the load balancing group from a master base station; exchanging the load information with other secondary base stations of the load balancing group; selecting a target secondary base station from the other secondary base stations according to the load information of other secondary base stations; and forwarding at least a portion of load of the secondary base station to the target secondary base station.

According to another aspect of the present disclosure, a secondary base station of a load balancing group for load balancing is provided. The secondary base station comprises: a receiving unit configured to receive a grouping information about the load balancing group from a master base station; an exchanging unit configured to exchange the load information with other secondary base stations of the load balancing group; a selecting unit configured to select a target secondary base station from the other secondary base stations according to the load information of other secondary base stations; and a forwarding unit configured to forward at least a portion of load of the secondary base station to the target secondary base station.

By means of the method and apparatus for load balancing, the master base station may determine the load balancing group and send the grouping information about the load balancing group to each secondary base station of the load balancing group, then each secondary base station of the load balancing group may directly perform load balancing with another secondary base station of the load balancing group without the master base station, thereby reducing delay and signaling overhead during the load balancing.

BRIEF DESCRIPTION OF THE DRAWINGS

The above and other objectives, features, advantages of the present disclosure will become more apparent from the specific description of the embodiments of the present disclosure in conjunction with the drawings, in which, same reference signs always indicate same elements, wherein.

DESCRIPTION OF THE EMBODIMENTS

The method and apparatus for load balancing according to the embodiments of the present disclosure will be described now with reference to the drawings.

Figure 1:
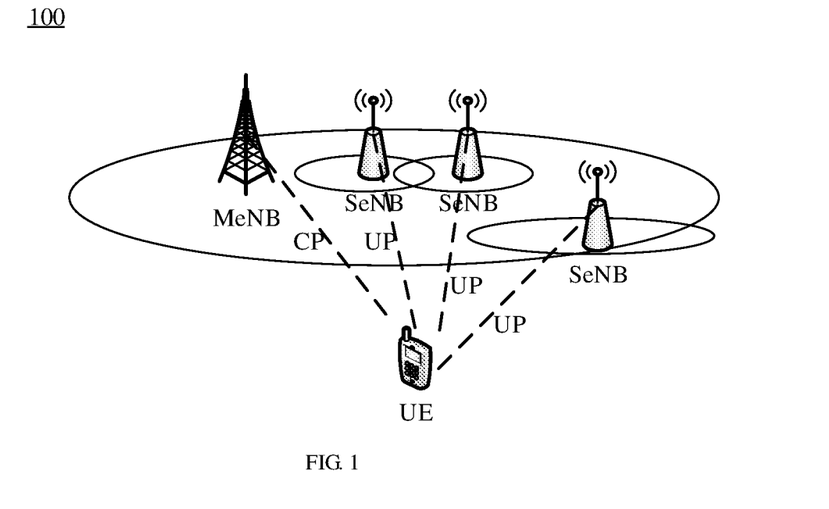
FIG. 1 is a diagram schematically illustrating a wireless communication scenario of the present disclosure.

FIG. 1 schematically illustrates a wireless communication scenario in which the method and apparatus for load balancing according to the embodiments of the present disclosure can be used. As shown in FIG. 1, the wireless communication scenario may include a master base station, candidate secondary base stations and a UE, wherein the UE maintains the control plane connection with the master base station while maintains the user plane connection with candidate secondary base stations. For example, candidate secondary base stations may be the secondary base stations located in the coverage of the master base station. Moreover, the master base station or candidate secondary base stations can be connected with an upper-layer device (not shown), and the upper-layer device may be further connected to a core network (not shown).

Herein, the item "base station" may also be expressed as "cell", "access point", "eNodeB" or "eNB". Further, for example, the master base station (MeNB) may be a macro base station with a relatively larger transmit power and a relatively wider coverage. Furthermore, for example, candidate secondary base stations (SeNBs) may be small cells, microcells, picocells or femto cells with relatively smaller transmit powers and a relatively smaller coverage.

Herein, the control plane connection between the master base station and the UE means the control plane radio connection, and the user plane connection between candidate secondary base stations and the UE means the user plane radio connection. That is, the master base station act as radio control plane to provide the control signaling with the UE, and candidate secondary base stations act as radio user plane to provide the user data with the UE, thereby achieving more efficient transmission in multi-connectivity operation. Further, for example, the control signaling may be the signaling about mobility management or radio configurations, while the user data may be the data about the services or applications.

Figure 2:
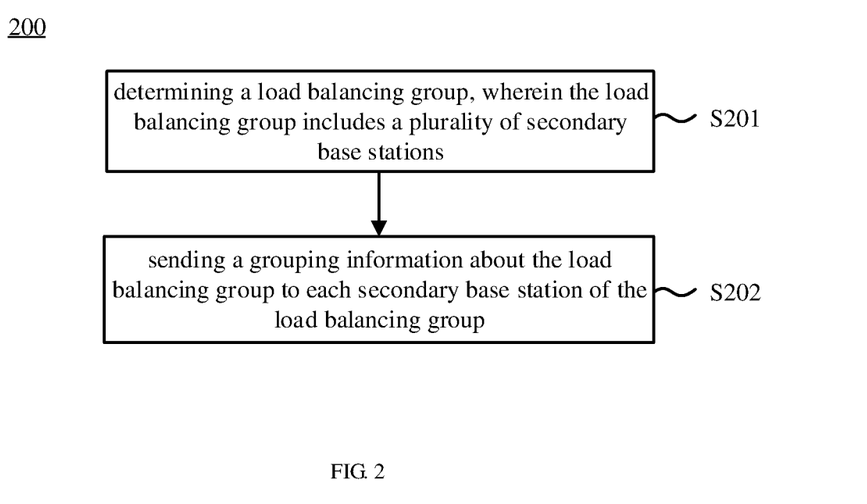
FIG. 2 is a flow chart illustrating the method executed by the master base station for load balancing according to an embodiment of the present disclosure.

FIG. 2 is a flow chart illustrating the method executed by the master base station in the above wireless communication scenario for load balancing according to an embodiment of the present disclosure. As shown in FIG. 2, the method (200) executed by the master base station comprises two steps. In particular, in step S201, the master base station determines a load balancing group, wherein the load balancing group includes a plurality of secondary base stations.

According to an example of the embodiment, the plurality of secondary base stations may be at least a portion of candidate secondary base stations. Specifically, for example, the master base station may receive a communication interface information of candidate secondary base stations, wherein the communication interface information may indicate the direct communication interfaces among candidate secondary base stations. Then, the master base station selects the plurality of secondary base stations from candidate secondary base stations according to the communication interface information. Herein, for example, the direct communication interface may be an X2 interface.

In the example, each secondary base station of candidate secondary base stations may send its communication interface information which may indicate the information of secondary base stations which have a direct communication interface with it. Accordingly, the master base station may receive the communication interface information of each secondary base station of candidate secondary base stations. Based on this, the master base station may select the plurality of secondary base stations from candidate secondary base stations.

For example, assuming that candidate secondary base stations may include $SeNB_1$, $SeNB_2$, $SeNB_3$ and $SeNB_4$, $SeNB_2$ and $SeNB_3$ may have an X2 interface with $SeNB_1$, respectively, and $SeNB_2$ may have an X2 interface with $SeNB_3$. Then, $SeNB_1$ may send its communication interface information which may indicate the information of $SeNB_2$ and $SeNB_3$ to the master base station, $SeNB_2$ may send its communication interface information which may indicate the information of $SeNB_1$ and $SeNB_3$ to the master base station, $SeNB_3$ may send its communication interface information which may indicate the information of $SeNB_1$ and $SeNB_2$ to the master base station, and $SeNB_4$ may send its communication interface information which may indicate the information that there is not a secondary base station having a direct communication interface with it to the master base station. Accordingly, the master base station may receive four communication interface information from $SeNB_1$, $SeNB_2$, $SeNB_3$ and $SeNB_4$, then may select $SeNB_1$, $SeNB_2$ and $SeNB_3$ as the load balancing group according to received four communication interface information.

After determining the load balancing group in step S201, in step S202, the master base station sends a grouping information about the load balancing group to each secondary base station of the load balancing group. Accordingly, each secondary base station of the load balancing group may acquire with which secondary base station(s) it can perform load balancing after receiving the grouping information. Herein, the grouping information about the load balancing group may be the information of secondary base stations acting as the load balancing group.

Moreover, according to an example of the embodiment, when a secondary base station performing load balancing with another secondary base station of the load balancing group and sending the information about load balancing with another secondary base station of the load balancing group to the master base station, the method (200) as shown in FIG. 2 further comprises receiving the load balancing indicator information from the secondary base station of the load balancing group, and then sending a load balancing control signaling to the UE according to the load balancing indicator information.

Specifically, for example, after the secondary base station performing load balancing with another secondary base station of the load balancing group, the secondary base station may send a load balancing indicator information to the master base station, wherein the load balancing indicator information may indicate the secondary base station forwarding at least a portion of its load to another secondary base station of the load balancing group. Accordingly, the master base station may receive the load balancing indicator information from the secondary base station of the load balancing group, and then sending a load balancing control signaling to the UE according to the load balancing indicator information.

Further, according to another example of the embodiment, the load balancing control signaling may control the UE to reconfigure the load corresponding to the secondary base station and another secondary base station of the load balancing group.

For example, in the above example, $SeNB_1$, $SeNB_2$ and $SeNB_3$ act as the load balancing group in step S201, then $SeNB_1$ may perform the load balancing with $SeNB_2$. After the load balancing with $SeNB_2$, $SeNB_1$ may send the load balancing indicator information to the master base station, wherein the load balancing indicator information may indicate $SeNB_1$ forwarding at least a portion of its load to $SeNB_2$. Accordingly, the master base station may receive the load balancing indicator information from SeNB$_1$, and then may send the load balancing control signaling to the UE according to the load balancing indicator information. Finally, the UE may reconfigure the load corresponding to SeNB$_1$ and SeNB$_2$ according to the load balancing control signaling.

Moreover, according to the above description, in the embodiment, it can be understood that the master base station maintains the control plane connection with the UE, while each secondary base station of the load balancing group maintains the user plane connection with the UE.

By means of the method executed by the master base station for load balancing, the master base station may determine the load balancing group and send the grouping information about the load balancing group to each secondary base station of the load balancing group, then each secondary base station of the load balancing group may directly perform load balancing with another secondary base station of the load balancing group without the master base station, thereby reducing delay and signaling overhead during the load balancing.

So far, the method executed by the master base station for load balancing according to the embodiment of the present disclosure has been described. According to another embodiment of the present disclosure, the method executed by the secondary base station of the load balancing group for load balancing is provided.

Figure 3:
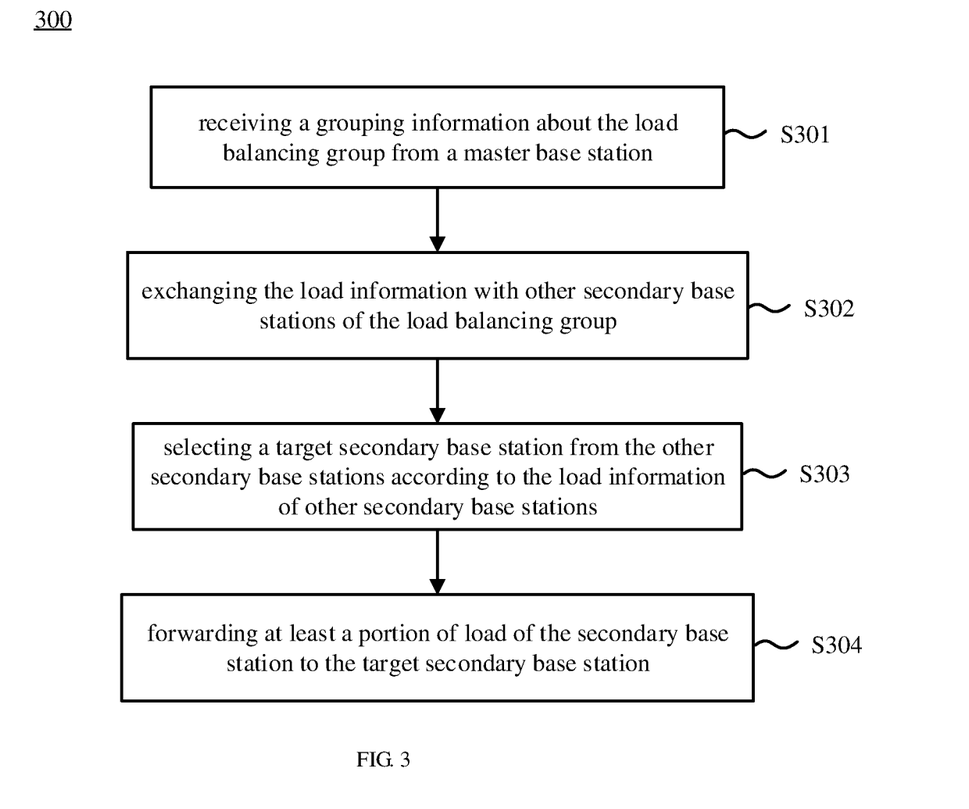
FIG. 3 is a flow chart illustrating the method executed by the secondary base station of the load balancing group for load balancing according to an embodiment of the present disclosure.

FIG. 3 is a flow chart illustrating the method executed by the secondary base station of the load balancing group for load balancing according to an embodiment of the present disclosure. As shown in FIG. 3, the method (300) executed by the secondary base station of the load balancing group comprises four steps. In particular, in step S301, the secondary base station receives the grouping information about the load balancing group from the master base station.

According to an example of the embodiment, before S301, the secondary base station as one of candidate secondary base stations may send its communication interface information to the master base station, wherein the communication interface information may indicate the information of secondary base stations which have a direct communication interface with it. Accordingly, after receiving the communication interface information, the master base station may use it for the determination of the load balancing group. Herein, the direct communication interface may be an X2 interface.

For example, assuming that candidate secondary base stations may include SeNB$_1$, SeNB$_2$, SeNB$_3$ and SeNB$_4$, SeNB$_2$ and SeNB$_3$ may have an X2 interface with SeNB$_1$, respectively, and SeNB$_1$ may be the secondary base station herein. Then, SeNB$_1$ may send its communication interface information which may indicate the information of SeNB$_2$ and SeNB$_3$ to the master base station. Accordingly, the master base station may receive the communication interface information from SeNB$_1$ and three communication interface information from SeNB$_2$, SeNB$_3$ and SeNB$_4$, then may select SeNB$_1$, SeNB$_2$ and SeNB$_3$ as the load balancing group according to received four communication interface information.

In the embodiment, for example, after the secondary base station of the load balancing group receiving the grouping information, the secondary base station of the load balancing group may acquire with which secondary base station(s) it can perform load balancing. Thus, the secondary base station may perform the load balancing with other secondary base stations of the load balancing group without the master base station, thereby reducing delay and signaling overhead during the load balancing.

For example, in the above example, after receiving the information of SeNB$_1$, SeNB$_2$ and SeNB$_3$ acting as the load balancing group in step S301, SeNB$_1$ may perform the load balancing with SeNB$_2$ and/or SeNB$_3$. Moreover, the load balancing between SeNB$_1$ and SeNB$_2$ and/or SeNB$_3$ does not need to be dominated by the master base station.

After receiving the grouping information about the load balancing group from the master base station in step S301, in step S302, the secondary base station exchanges the load information with other secondary base stations of the load balancing group. Herein, the item "exchange" may be also expressed as "share".

In the embodiment, for example, after exchanging the load information with other secondary base stations of the load balancing group, the secondary base station may acquire the load status of other secondary base stations of the load balancing group. Then, when deciding to perform load balancing, the secondary base station may select a target secondary base stations from the load balancing group by taking account into the load status of other secondary base stations of the load balancing group. For example, when deciding to perform load balancing, the secondary base station may select a relatively lower-load secondary base station from the load balancing group as the target secondary base station.

For example, in the above example, after receiving the information of SeNB$_1$, SeNB$_2$ and SeNB$_3$ acting as the load balancing group in step S301, then in step S301 SeNB$_1$ may exchange the load information with SeNB$_2$ and SeNB$_3$, such that SeNB$_1$ may acquire the load status of SeNB$_2$ and SeNB$_3$. Assuming that the load of SeNB$_2$ is relatively lower and the load of SeNB$_3$ is relatively higher, then when deciding to perform load balancing, SeNB$_1$ may select SeNB$_2$ as the target secondary base station.

According to an example of the embodiment, the secondary base station may periodically exchange the load information with other secondary base stations of the load balancing group based on a periodical mechanism. For example, the secondary base station may exchange the load information with other secondary base stations of the load balancing group every 5 ms. Alternatively, the secondary base station may also exchange the load information with other secondary base stations of the load balancing group in real-time based on a real-time mechanism.

According to another example of the embodiment, the load information may include at least one of the usage information of physical resources and the status information of radio resources. Specifically, the more load the secondary base station carries, the more resources it uses. Thus, the resources used by the secondary base station due to the carried load may indicate the load information of the secondary base station. Further, the physical resources herein may be antenna ports, and the radio resources herein may be time and/or frequency resources.

Then, in step S303, the secondary base station selects a target secondary base station from the other secondary base stations according to the load information of other secondary base stations. Herein, step S303 may be executed after step S302.

As described above, when deciding to perform load balancing, the secondary base station may select a target secondary base stations from the load balancing group by taking account into the load information of other secondary base stations of the load balancing group, which is exchanged with other secondary base stations of the load balancing group in step S302.

After selecting the target secondary base station in step S303, in step S304, the secondary base station forwards at least a portion of load of the secondary base station to the target secondary base station.

According to an example of the embodiment, before step S304, the secondary base station may receive a confirming information from the target secondary base station. For example, after selecting the target secondary base station in step S303 and before step S304, the secondary base station may send a load balancing request to the target secondary base station. After receiving a load balancing ACK from the target secondary base station, the secondary base station may execute step S304.

In the embodiment, the portion of load of the secondary base station may be considered as one or more Data Radio Bearer (DRB). For example, the secondary base station may release a DRB, and forward the load corresponding to the DRB to the target secondary base.

For example, in the above example, $SeNB_1$ may select $SeNB_2$ from $SeNB_2$ and $SeNB_3$ as the target secondary base station in step S303, then in step S304, $SeNB_1$ may release a DRB and forward the load corresponding to the DRB to $SeNB_2$.

Moreover, according to another example of the embodiment, after forwarding at least a portion of load of the secondary base station to the target secondary base station in step S304, the method executed by the secondary base station of the load balancing group for load balancing further comprises that the secondary base station sends a load balancing indicator information to the master base station, wherein the load balancing indicator information indicates the secondary base station forwarding at least a portion of load to the target secondary base station.

In the embodiment, after the secondary base station of the load balancing group performing load balancing with another secondary base station of the load balancing group, it may send the load balancing indicator information to the master base station, wherein the load balancing indicator information may indicate it forwarding at least a portion of its load to another secondary base station of the load balancing group. Accordingly, the master base station may receive the load balancing indicator information from the secondary base station of the load balancing group, and then send a load balancing control signaling to the UE according to the load balancing indicator information. In particular, the load balancing control signaling may control the UE to reconfigure the load corresponding to the secondary base station and another secondary base station of the load balancing group.

For example, in the above example, $SeNB_1$, $SeNB_2$ and $SeNB_3$ act as the load balancing group in step S301, then in steps S303 and S304, $SeNB_1$ may perform the load balancing with $SeNB_2$. After the load balancing with $SeNB_2$, $SeNB_1$ may send the load balancing indicator information to the master base station, wherein the load balancing indicator information may indicate $SeNB_1$ forwarding at least a portion of its load to $SeNB_2$. Accordingly, the master base station may receive the load balancing indicator information from $SeNB_1$, and then may send the load balancing control signaling to the UE according to the load balancing indicator information. Finally, the UE may reconfigure the load corresponding to $SeNB_1$ and $SeNB_2$ according to the load balancing control signaling.

By means of the method executed by the secondary base station of the load balancing group for load balancing, the secondary base station may receive the grouping information about the load balancing group from the master base station, and then may directly perform load balancing with another secondary base station of the load balancing group without the master base station, thereby reducing delay and signaling overhead during the load balancing.

So far, the method executed by the master base station and the method executed by the secondary base station of the load balancing group for load balancing according to an embodiment of the present disclosure have been described in detail. According to an example of the embodiment, the method executed by the system comprising the master base station and the secondary base stations of the load balancing group is provided.

Specifically, the method executed by the system comprises the master base station determining a load balancing group, wherein the load balancing group includes a plurality of secondary base stations and sending a grouping information about the load balancing group to each secondary base station of the load balancing group, and then the secondary base station of the load balancing group receiving a grouping information about the load balancing group from a master base station. Further, the method executed by the system further comprises the secondary base station of the load balancing group exchanging the load information with other secondary base stations of the load balancing group, selecting a target secondary base station from the other secondary base stations according to the load information of other secondary base stations and forwarding at least a portion of load of the secondary base station to the target secondary base station.

According to another example of the embodiment, the system further comprises the UE which maintains the control plane connection with the master base station and maintains the user plane connection with the secondary base stations of the load balancing group. Accordingly, the method executed by the system further comprises the secondary base station sending a load balancing indicator information to the master base station, wherein the load balancing indicator information indicates the secondary base station forwarding at least a portion of load to the target secondary base station, and the master base station receiving a load balancing indicator information from a secondary base station of the plurality of secondary base stations and sending a load balancing control signaling to the user equipment according to the load balancing indicator information, and the UE reconfiguring the load corresponding to the secondary base station and the target secondary base station according to the load balancing control signaling.

Figure 4:
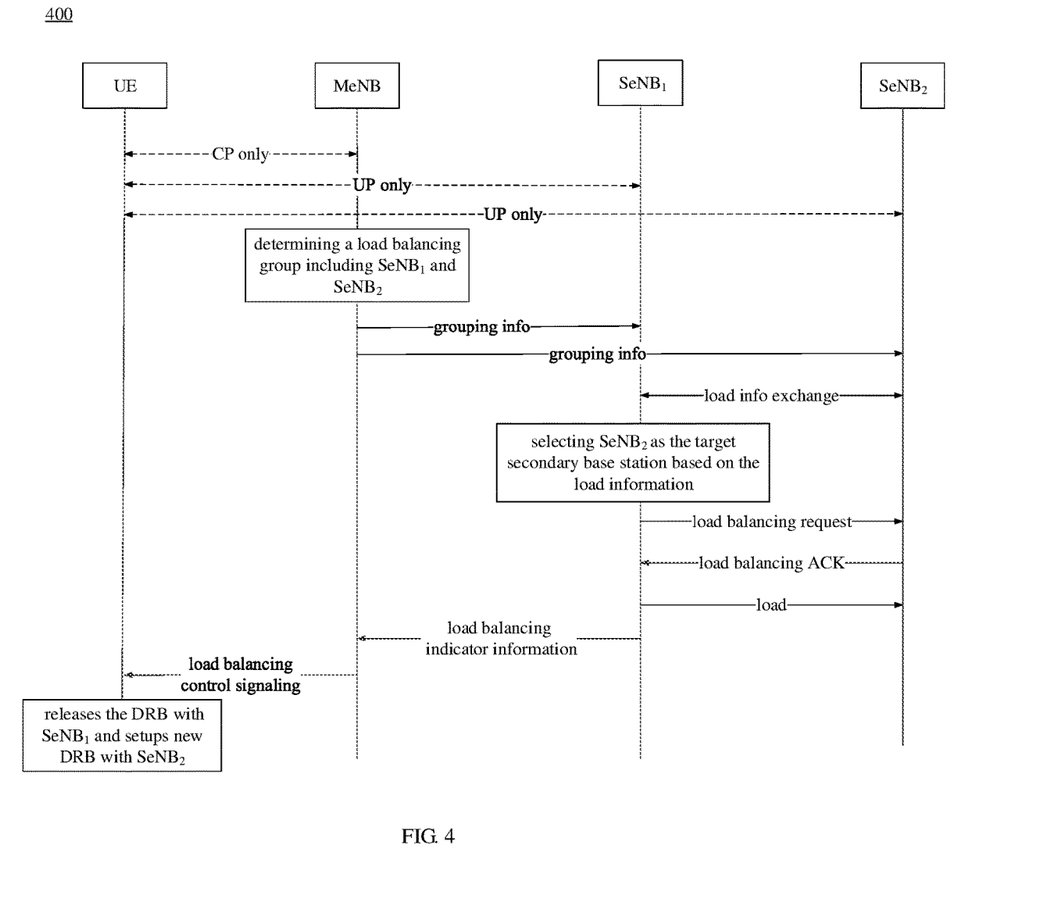
FIG. 4 is a diagram schematically illustrating the method executed by the system comprising the master base station and the secondary base stations of the load balancing group.

FIG. 4 illustrates the method executed by the system comprising the master base station and the secondary base stations of the load balancing group. As shown in FIG. 4, the UE only maintains the control plane connection with MeNB and only maintains the user plane connection with $SeNB_1$ and $SeNB_2$. Further, as shown in FIG. 4, MeNB is the master base station, $SeNB_1$ and $SeNB_2$ are the secondary base stations of the load balancing group, $SeNB_1$ is the secondary base station which decides to perform the load balancing, and $SeNB_2$ is the target secondary base station.

Firstly, MeNB determines a load balancing group including $SeNB_1$ and $SeNB_2$, and then sends the grouping information about the load balancing group to $SeNB_1$ and $SeNB_2$. After receiving the grouping information, $SeNB_1$ exchanges the load information with the $SeNB_2$. When deciding to release a DRB due to resource limitation, $SeNB_1$ cannot forward the load corresponding to the DRB to MeNB because only the control plane data is accepted via MeNB.

Therefore, SeNB$_1$ selects SeNB$_2$ as the target secondary base station based on the load information, e.g. SeNB$_2$ is not in a high-load situation according to its load information.

Then, SeNB$_1$ sends a load balancing request to SeNB$_2$. After receiving a load balancing ACK from SeNB$_2$, SeNB$_1$ forwards the load corresponding to the DRB to SeNB$_2$. After load balancing with SeNB$_2$, SeNB$_1$ sends a load balancing indicator information to MeNB.

After receiving the load balancing indicator information, MeNB sends a load balancing control signaling to the UE according to the load balancing indicator information. Finally, the UE releases the DRB with SeNB$_1$ and setups new DRB with SeNB$_2$ according to the load balancing control signaling.

By means of the method executed by the system for load balancing, the master base station may determine the load balancing group and send the grouping information about the load balancing group to each secondary base station of the load balancing group, then each secondary base station of the load balancing group may directly perform load balancing with another secondary base station of the load balancing group without the master base station, thereby reducing delay and signaling overhead during the load balancing.

Figure 5:
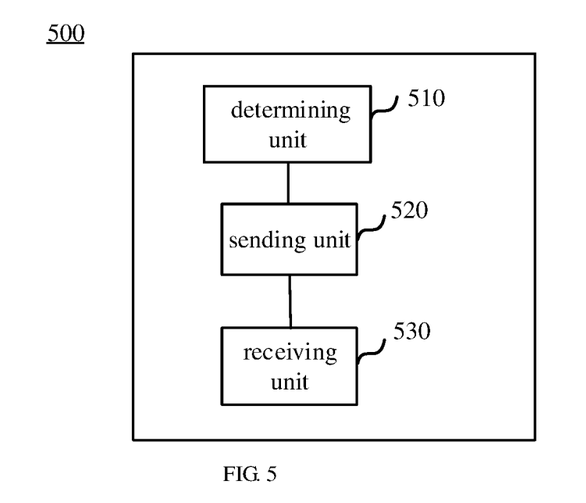
FIG. 5 is a block diagram illustrating the units of the master base station for load balancing according to an embodiment of the present disclosure.

FIG. 5 is a block diagram illustrating the units of the master base station for load balancing according to an embodiment of the present disclosure. As shown in FIG. 5, the master base station (500) comprises a determining unit (510) configured to determine a load balancing group, wherein the load balancing group includes a plurality of secondary base stations; and a sending unit (520) configured to send a grouping information about the load balancing group to each secondary base station of the load balancing group. Further, in addition to the determining unit (510) and the sending unit (520), the master base station may further comprise other units that can be used to implement communication with the UE and/or the upper-layer device. Since these units are irrelevant of the embodiment of the present disclosure, they are not shown or depicted herein.

According to an example of the embodiment, the plurality of secondary base stations may be at least a portion of candidate secondary base stations. Specifically, for example, the master base station may further comprise a receiving unit (530) configured to receive a communication interface information of candidate secondary base stations, wherein the communication interface information may indicate the direct communication interfaces among candidate secondary base stations. Then, the determining unit (510) selects the plurality of secondary base stations from candidate secondary base stations according to the communication interface information. Herein, for example, the direct communication interface may be an X2 interface.

In the example, each secondary base station of candidate secondary base stations may send its communication interface information which may indicate the information of secondary base stations which have a direct communication interface with it. Accordingly, the receiving unit (530) may receive the communication interface information of each secondary base station of candidate secondary base stations. Based on this, the determining unit (510) may select the plurality of secondary base stations from candidate secondary base stations.

For example, assuming that candidate secondary base stations may include SeNB$_1$, SeNB$_2$, SeNB$_3$ and SeNB$_4$, SeNB$_2$ and SeNB$_3$ may have an X2 interface with SeNB$_1$, respectively, and SeNB$_2$ may have an X2 interface with SeNB$_3$. Then, SeNB$_1$ may send its communication interface information which may indicate the information of SeNB$_2$ and SeNB$_3$ to the master base station, SeNB$_2$ may send its communication interface information which may indicate the information of SeNB$_1$ and SeNB$_3$ to the master base station, SeNB$_3$ may send its communication interface information which may indicate the information of SeNB$_1$ and SeNB$_2$ to the master base station, and SeNB$_4$ may send its communication interface information which may indicate the information that there is not a secondary base station having a direct communication interface with it to the master base station. Accordingly, the receiving unit (530) may receive four communication interface information from SeNB$_1$, SeNB$_2$, SeNB$_3$ and SeNB$_4$, then may select SeNB$_1$, SeNB$_2$ and SeNB$_3$ as the load balancing group according to received four communication interface information.

After the determining unit (510) determining the load balancing group, the sending unit (520) sends a grouping information about the load balancing group to each secondary base station of the load balancing group. Accordingly, each secondary base station of the load balancing group may acquire with which secondary base station(s) it can perform load balancing after receiving the grouping information. Herein, the grouping information about the load balancing group may be the information of secondary base stations acting as the load balancing group.

Moreover, according to an example of the embodiment, when a secondary base station performing load balancing with another secondary base station of the load balancing group and sending the information about load balancing with another secondary base station of the load balancing group to the master base station, the receiving unit (530) is further configured to receive the load balancing indicator information from the secondary base station of the load balancing group, and then sending a load balancing control signaling to the UE according to the load balancing indicator information.

Specifically, for example, after the secondary base station of the load balancing group performing load balancing with another secondary base station of the load balancing group, the secondary base station may send a load balancing indicator information to the master base station, wherein the load balancing indicator information may indicate the secondary base station forwarding at least a portion of its load to another secondary base station of the load balancing group. Accordingly, the receiving unit (530) may receive the load balancing indicator information from the secondary base station of the load balancing group, and then the sending unit (520) may be configured to send a load balancing control signaling to the UE according to the load balancing indicator information.

Further, according to another example of the embodiment, the load balancing control signaling may control the UE to reconfigure the load corresponding to the secondary base station and another secondary base station of the load balancing group.

For example, in the above example, SeNB$_1$, SeNB$_2$ and SeNB$_3$ act as the load balancing group, then SeNB$_1$ may perform the load balancing with SeNB$_2$. After the load balancing with SeNB$_2$, SeNB$_1$ may send the load balancing indicator information to the master base station, wherein the load balancing indicator information may indicate SeNB$_1$ forwarding at least a portion of its load to SeNB$_2$. Accordingly, the receiving unit (530) may receive the load balancing indicator information from SeNB$_1$, and then the sending unit (520) may send the load balancing control signaling to the UE according to the load balancing indicator information. Finally, the UE may reconfigure the load corresponding to $SeNB_1$ and $SeNB_2$ according to the load balancing control signaling.

Moreover, according to the above description, in the embodiment, it can be understood that the master base station maintains the control plane connection with the UE, while each secondary base station of the load balancing group maintains the user plane connection with the UE.

By means of the master base station for load balancing, the master base station may determine the load balancing group and send the grouping information about the load balancing group to each secondary base station of the load balancing group, then each secondary base station of the load balancing group may directly perform load balancing with another secondary base station of the load balancing group without the master base station, thereby reducing delay and signaling overhead during the load balancing.

So far, the master base station for load balancing according to the embodiment of the present disclosure has been described. According to another embodiment of the present disclosure, the secondary base station of the load balancing group for load balancing is provided.

Figure 6:
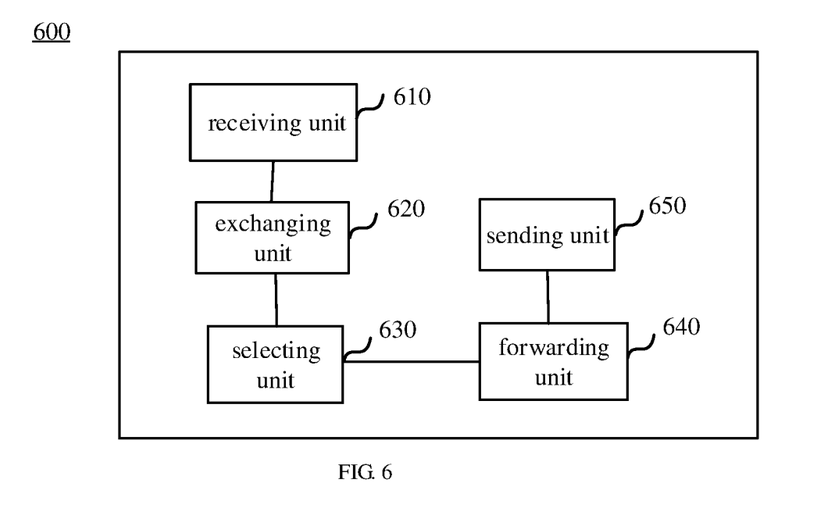
FIG. 6 is a block diagram illustrating the units of the secondary base station of the load balancing group for load balancing according to an embodiment of the present disclosure.

FIG. 6 is a block diagram illustrating the units of the secondary base station of the load balancing group for load balancing according to an embodiment of the present disclosure. As shown in FIG. 6, the secondary base station (600) comprises a receiving unit (610) configured to receive a grouping information about the load balancing group from a master base station; an exchanging unit (620) configured to exchange the load information with other secondary base stations of the load balancing group; a selecting unit (630) configured to select a target secondary base station from the other secondary base stations according to the load information of other secondary base stations; and a forwarding unit (640) configured to forward at least a portion of load of the secondary base station to the target secondary base station. Further, in addition to the receiving unit (610), the exchanging unit (620), the selecting unit (630) and the forwarding unit (640), the secondary base station may further comprise other units that can be used to implement communication with the UE and/or other devices. Since these units are irrelevant of the embodiment of the present disclosure, they are not shown or depicted herein.

According to an example of the embodiment, before the receiving unit (610) receiving a grouping information about the load balancing group from a master base station, the secondary base station as one of candidate secondary base stations may further comprise a sending unit (650) configured to send its communication interface information to the master base station, wherein the communication interface information may indicate the information of secondary base stations which have a direct communication interface with it. Accordingly, after receiving the communication interface information, the master base station may use it for the determination of the load balancing group. Herein, the direct communication interface may be an X2 interface.

For example, assuming that candidate secondary base stations may include $SeNB_1$, $SeNB_2$, $SeNB_3$ and $SeNB_4$, $SeNB_2$ and $SeNB_3$ may have an X2 interface with $SeNB_1$, respectively, and $SeNB_1$ may be the secondary base station herein. Then, the sending unit (650) may send its communication interface information which may indicate the information of $SeNB_2$ and $SeNB_3$ to the master base station. Accordingly, the master base station may receive the communication interface information from $SeNB_1$ and three communication interface information from $SeNB_2$, $SeNB_3$ and $SeNB_4$, then may select $SeNB_1$, $SeNB_2$ and $SeNB_3$ as the load balancing group according to received four communication interface information.

In the embodiment, for example, after the receiving unit (610) receiving the grouping information, the secondary base station of the load balancing group may acquire with which secondary base station(s) it can perform load balancing. Thus, the secondary base station may perform the load balancing with other secondary base stations of the load balancing group without the master base station, thereby reducing delay and signaling overhead during the load balancing.

For example, in the above example, after the receiving unit (610) receiving the information of $SeNB_1$, $SeNB_2$ and $SeNB_3$ acting as the load balancing group, $SeNB_1$ may perform the load balancing with $SeNB_2$ and/or $SeNB_3$. Moreover, the load balancing between $SeNB_1$ and $SeNB_2$ and/or $SeNB_3$ does not need to be dominated by the master base station.

After the receiving unit (610) receiving the grouping information about the load balancing group from the master base station, then the exchanging unit (620) exchanges the load information with other secondary base stations of the load balancing group. Herein, the item "exchange" may be also expressed as "share".

In the embodiment, for example, after the exchanging unit (620) exchanging the load information with other secondary base stations of the load balancing group, the secondary base station may acquire the load status of other secondary base stations of the load balancing group. Then, when deciding to perform load balancing, the selecting unit (630) may select a target secondary base stations from the load balancing group by taking account into the load status of other secondary base stations of the load balancing group. For example, when deciding to perform load balancing, the selecting unit (630) may select a relatively lower-load secondary base station from the load balancing group as the target secondary base station.

For example, in the above example, after the receiving unit (610) receiving the information of $SeNB_1$, $SeNB_2$ and $SeNB_3$ acting as the load balancing group, then the exchanging unit (620) may exchange the load information with $SeNB_2$ and $SeNB_3$, such that $SeNB_1$ may acquire the load status of $SeNB_2$ and $SeNB_3$. Assuming that the load of $SeNB_2$ is relatively lower and the load of $SeNB_3$ is relatively higher, then when deciding to perform load balancing, the selecting unit (630) may select $SeNB_2$ as the target secondary base station.

According to an example of the embodiment, the exchanging unit (620) may periodically exchange the load information with other secondary base stations of the load balancing group based on a periodical mechanism. For example, the exchanging unit (620) may exchange the load information with other secondary base stations of the load balancing group every 5 ms. Alternatively, the exchanging unit (620) may also exchange the load information with other secondary base stations of the load balancing group in real-time based on a real-time mechanism.

According to another example of the embodiment, the load information may include at least one of the usage information of physical resources and the status information of radio resources. Specifically, the more load the secondary base station carries, the more resources it uses. Thus, the resources used by the secondary base station due to the carried load may indicate the load information of the secondary base station. Further, the physical resources herein may be antenna ports, and the radio resources herein may be time and/or frequency resources.

Then, the selecting unit (630) selects a target secondary base station from the other secondary base stations according to the load information of other secondary base stations. As described above, when deciding to perform load balancing, the selecting unit (630) may select a target secondary base stations from the load balancing group by taking account into the load information of other secondary base stations of the load balancing group, which is exchanged with other secondary base stations of the load balancing group in step S302.

After the selecting unit (630) selecting the target secondary base station, then the forwarding unit (640) forwards at least a portion of load of the secondary base station to the target secondary base station.

According to an example of the embodiment, before the forwarding unit (640) forwarding at least a portion of load of the secondary base station to the target secondary base station, the secondary base station may receive a confirming information from the target secondary base station. For example, after the selecting unit (630) selecting the target secondary base station and before the forwarding unit (640) forwarding at least a portion of load of the secondary base station to the target secondary base station, the sending unit (650) may send a load balancing request to the target secondary base station. After the receiving unit (610) receiving a load balancing ACK from the target secondary base station, the forwarding unit (640) may forward at least a portion of load of the secondary base station to the target secondary base station.

In the embodiment, the portion of load of the secondary base station may be considered as one or more Data Radio Bearer (DRB). For example, the forwarding unit (640) may release a DRB, and forward the load corresponding to the DRB to the target secondary base. For example, in the above example, the selecting unit (630) may select $SeNB_2$ from $SeNB_2$ and $SeNB_3$ as the target secondary base station, then the forwarding unit (640) may release a DRB and forward the load corresponding to the DRB to $SeNB_2$.

Moreover, according to another example of the embodiment, after the forwarding unit (640) forwarding at least a portion of load of the secondary base station to the target secondary base station, the sending unit (650) may send a load balancing indicator information to the master base station, wherein the load balancing indicator information indicates the forwarding unit (640) forwarding at least a portion of load to the target secondary base station.

In the embodiment, after the secondary base station of the load balancing group performing load balancing with another secondary base station of the load balancing group, the sending unit (650) may send the load balancing indicator information to the master base station, wherein the load balancing indicator information may indicate it forwarding at least a portion of its load to another secondary base station of the load balancing group. Accordingly, the master base station may receive the load balancing indicator information from the secondary base station of the load balancing group, and then send a load balancing control signaling to the UE according to the load balancing indicator information. In particular, the load balancing control signaling may control the UE to reconfigure the load corresponding to the secondary base station and another secondary base station of the load balancing group.

For example, in the above example, $SeNB_1$, $SeNB_2$ and $SeNB_3$ act as the load balancing group, then $SeNB_1$ may perform the load balancing with $SeNB_2$. After the load balancing with $SeNB_2$, the sending unit (650) may send the load balancing indicator information to the master base station, wherein the load balancing indicator information may indicate the forwarding unit (640) forwarding at least a portion of its load to $SeNB_2$. Accordingly, the master base station may receive the load balancing indicator information from $SeNB_1$, and then may send the load balancing control signaling to the UE according to the load balancing indicator information. Finally, the UE may reconfigure the load corresponding to $SeNB_1$ and $SeNB_2$ according to the load balancing control signaling.

By means of the secondary base station of the load balancing group for load balancing, the secondary base station may receive the grouping information about the load balancing group from the master base station, and then may directly perform load balancing with another secondary base station of the load balancing group without the master base station, thereby reducing delay and signaling overhead during the load balancing.

The method and apparatus for load balancing according to the embodiments of the present disclosure have been descried hereinabove. It should be appreciated that these embodiments are only illustrative, rather than limitative. Further, it will be readily apparent to a person skilled in the art that the methods, the elements, units and apparatuses described in connection with embodiments of the invention may be implemented in hardware, in software, or as a combination of both. In particular it will be appreciated that the embodiments of the invention may be implemented by a computer program or computer programs running on a computer or being executed by a microprocessor. Any apparatus implementing the invention may in particular take the form of a computing device.

Moreover, the exemplary embodiments of the present disclosure have been shown and described, but a person skilled in the art should appreciate that various changes in forms and details may be made to these exemplary embodiments without departing from the scope and spirit of the present disclosure as defined in the claims and equivalents thereof.

What is claimed is:

1. A method executed by a master base station for load balancing, the method comprising:
   determining a load balancing group, wherein the load balancing group includes a plurality of secondary base stations; and
   sending a grouping information about the load balancing group to each secondary base station of the load balancing group,
   wherein the master base station maintains a control plane connection with a user equipment, and each secondary base station of the load balancing group maintains a user plane connection with the user equipment.

2. The method according to claim 1, further comprising:
   receiving a load balancing indicator information from a secondary base station of the plurality of secondary base stations; and sending a load balancing control signaling to the user equipment according to the load balancing indicator information.

3. A method executed by a master base station for load balancing, the method comprising:
   determining a load balancing group, wherein the load balancing group includes a plurality of secondary base stations; and
   sending a grouping information about the load balancing group to each secondary base station of the load balancing group,
   wherein the plurality of secondary base stations are at least a portion of candidate secondary base stations;

wherein determining a load balancing group comprising:
receiving a communication interface information of candidate secondary base stations; and
selecting the plurality of secondary base stations from candidate secondary base stations according to the communication interface information.

4. A master base station for load balancing, the master base station comprising:
a determining unit configured to determine a load balancing group, wherein the load balancing group includes a plurality of secondary base stations; and
a sending unit configured to send a grouping information about the load balancing group to each secondary base station of the load balancing group,
wherein the master base station maintains a control plane connection with a user equipment, and each secondary base station of the load balancing group maintains a user plane connection with the user equipment.

5. The master base station according to claim 4, further comprising:
a receiving unit configured to receive a load balancing indicator information from a secondary base station of the plurality of secondary base stations;
wherein the sending unit is further configured to send a load balancing control signaling to the user equipment according to the load balancing indicator information.

6. A master base station for load balancing, the master base station comprising:
a determining unit configured to determine a load balancing group, wherein the load balancing group includes a plurality of secondary base stations; and
a sending unit configured to send a grouping information about the load balancing group to each secondary base station of the load balancing group,
wherein the plurality of secondary base stations are at least a portion of candidate secondary base stations;
wherein the determining unit is further configured to:
receive a communication interface information of candidate secondary base stations; and
select the plurality of secondary base stations from candidate secondary base stations according to the communication interface information.

7. A secondary base station of a load balancing group for load balancing, the secondary base station comprising:
a receiving unit configured to receive a grouping information about the load balancing group from a master base station;
an exchanging unit configured to exchange the load information with other secondary base stations of the load balancing group;
a selecting unit configured to select a target secondary base station from the other secondary base stations according to the load information of other secondary base stations;
a forwarding unit configured to forward at least a portion of load of the secondary base station to the target secondary base station; and
a sending unit configured to send a load balancing indicator information to the master base station,
wherein the load balancing indicator information indicates the secondary base station forwarding at least a portion of load to the target secondary base station.

8. The secondary base station according to claim 7, further comprising:
a sending unit configured to send a communication interface information of the secondary base station to the master base station,
wherein the communication interface information indicates the information of secondary base stations which have a direct communication interface with the secondary base station and is used for the determination of the load balancing group.

9. The secondary base station according to claim 7, wherein
the load information including at least one of the usage information of physical resources and the status information of radio resources.

* * * * *